US007198245B2

(12) United States Patent
Chosei et al.

(10) Patent No.: US 7,198,245 B2
(45) Date of Patent: Apr. 3, 2007

(54) ENGINE-DRIVEN WORK MACHINE

(75) Inventors: Noboru Chosei, Fukui-Ken (JP); Tooru Masui, Fukui-Ken (JP)

(73) Assignee: Denyo Kabushiki Kaisha, Tokyo-To (JP)

( * ) Notice: Subject to any disclaimer, the term of this patent is extended or adjusted under 35 U.S.C. 154(b) by 210 days.

(21) Appl. No.: 10/800,700

(22) Filed: Mar. 16, 2004

(65) Prior Publication Data

US 2005/0166690 A1 Aug. 4, 2005

(30) Foreign Application Priority Data

Jan. 14, 2004 (JP) ............................ 2004-006746

(51) Int. Cl.
*F16M 1/00* (2006.01)

(52) U.S. Cl. ...................................................... 248/637

(58) Field of Classification Search ............... 294/67.1, 294/67.3; 248/637, 638, 646, 653, 658, 655, 248/671; 212/299
See application file for complete search history.

(56) References Cited

U.S. PATENT DOCUMENTS 1,769,134 A * 7/1930 Haff .......................... 294/67.3
3,606,438 A * 9/1971 Feczko .................... 294/68.27
5,012,553 A * 5/1991 Hardigg et al. ............... 16/445
5,845,978 A * 12/1998 Jung .......................... 312/244
6,092,768 A * 7/2000 Larson et al. ............... 248/129
6,181,019 B1 * 1/2001 Frank ......................... 290/1 A

FOREIGN PATENT DOCUMENTS

| | | |
|---|---|---|
| JP | 59-15680 | 1/1984 |
| JP | 1-62971 | 4/1989 |
| JP | 09-052690 | 2/1997 |
| JP | 09-217632 | 8/1997 |

* cited by examiner

*Primary Examiner*—Richard Ridley
*Assistant Examiner*—Justin Krause
(74) *Attorney, Agent, or Firm*—Jacobson Holman PLLC

(57) ABSTRACT

An engine-driven work machine is attached to a pipe frame, and has a structure suitable for lifting. The engine-driven work machine has a transportable constitution attached to the pipe frame, and includes a collapsible sling fitting that is rotatably connected to the pipe frame.

2 Claims, 4 Drawing Sheets

ENGINE-DRIVEN WORK MACHINE

BACKGROUND OF THE INVENTION

1. Field of the Invention

This invention relates to an engine-driven work machine, which is driven by an engine while performing work, and more particularly relates to an engine-driven work machine such as an electric power generator, a welding machine, and the like, that is attached to a pipe frame in a transportable constitution.

2. Description of the Related Art

This type of engine-driven work machine is often attached to a pipe frame, such as that disclosed in Japanese Patent Laid-Open No. 1997- 217632, in order to make it easier to handle when moving and transporting it around the work place.

Large machines are fitted with sling fittings, which interlock with members for slinging such as hooks and ropes, so that the machines can be lifted by crane. Japanese Utility Model Laid-open No. 1984-015680 and Japanese Utility Model Laid-open No. 1989-062971 illustrate a large engine-driven work machine that has this type of sling fitting.

Small engine-driven work machines are attached to pipe frames, and do not have the sling fittings of the larger machines.

However, when using a small machine outdoors, even though it is desirable that it should be possible to move and transport the small machine by crane and the like, the structure is not suitable for slinging.

SUMMARY OF THE INVENTION

This invention has been realized in view of the above points, and aims to provide an engine-driven work machine that is attached to a pipe frame and has a structure suitable for slinging.

In order to achieve these objects, this invention provides the invention described in aspects one to four.

In the first aspect, this invention provides an engine-driven work machine comprising a transportable structure that is attached to a pipe frame, a sling fitting being provided above the pipe frame and rotatably connected thereto.

In the second aspect, the engine-driven work machine of the first aspect comprises a stopper which stops the rotation of the sling fitting in a near-vertical direction.

In the third aspect, the engine-driven work machine of the first aspect comprises a shock-absorber on the side of the sling fitting.

In the fourth aspect, in the engine-driven work machine of the first aspect, the sling fitting has a bent section, which extends at a right-angle to the bottom edge of a center section, and bent sections, which are approximately C-shaped in plan view and are provided near both ends of the sling fitting.

This invention obtains the following effects.

According to the invention of the first aspect, the engine-driven work machine can be handled normally by using a pipe frame, and in addition, by raising the sling fitting, which is usually in a collapsed position, the engine-driven work machine can be lifted by a crane or the like.

According to the invention of the second aspect, the rotation of the sling fitting is stopped in a near-vertical direction, so that the stopper connects with the sling fitting at a predetermined position, enabling the engine-driven work machine to be lifted in a stable state.

According to the invention of the third aspect, the shock-absorber prevents collision with the surface of the work machine main body even when the sling fitting is collapsed.

According to the invention of the fourth aspect, the sling fitting has a bent section for increasing its rigidity, whereby the weight of the sling fitting can be reduced.

DESCRIPTION OF THE PREFERRED EMBODIMENTS

Preferred embodiments of the invention will be explained with reference to the accompanying diagrams.

Figure 1A:
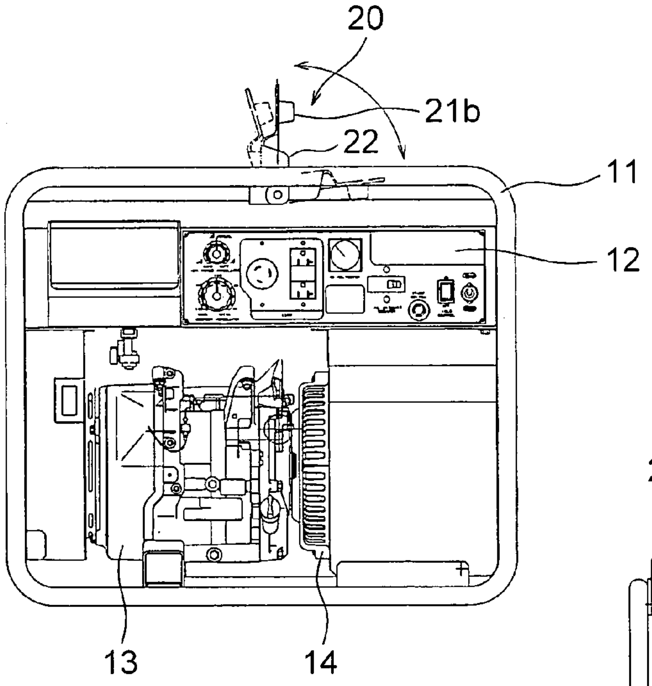
FIGS. 1A to 1C are diagrams illustrating a constitution of a first embodiment of this invention, FIG. 1A showing a front view, FIG. 1B, a right side view, and FIG. 1C, a plan view.
Figure 1B:
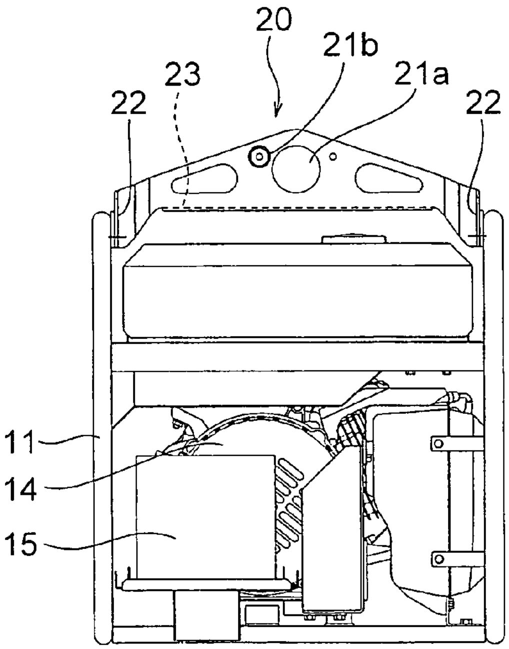
Figure 1C:
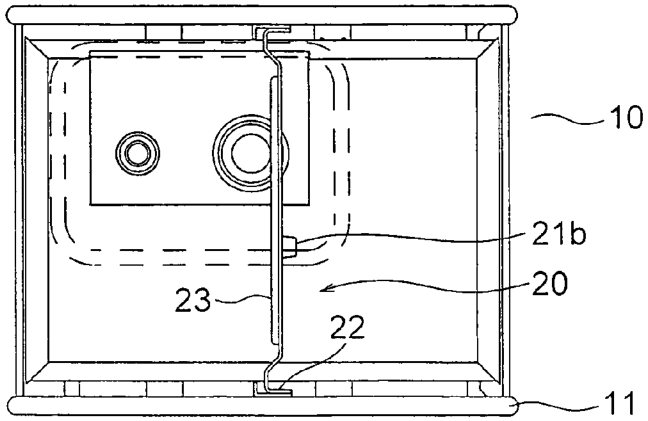

FIGS. 1A, 1B, and 1C respectively show a front view, a right side view, and a plan view of a first embodiment of this invention. As shown in FIGS. 1A, 1B, and 1C, an engine-driven work machine 10 comprises a control panel 12, an engine 13, an electric power generator 14, a battery 15, and the like, which are attached to a pipe frame 11, comprising a pipe and connecting members. According to this constitution, when moving or transporting the engine-driven work machine 10, an operator can handle it by taking hold of the frame.

A collapsible sling fitting 20 is provided on the top of the pipe frame 11 at a position corresponding to the center of gravity of the work machine. The sling fitting 20 has a hole for slinging 21*a* and an elastic shock-absorber 21*b* that are formed in the center section of an approximately mountain-shaped plate, bent sections for hinges 22 that are formed at each end of the plate, and a bending edge section 23 for strengthening, which extends along the center bottom edge of the plate at a right-angle to the center section 21.

To make the structure lighter, in addition to the hole for slinging 21*a*, holes are provided in the sling fitting 20 by partially removing the material. Furthermore, to increase the local rigidity of the sling fitting 20, bent sections that are approximately C-shaped in plan view are formed near each end of the sling fitting 20 to increase its bending strength.

The sling fitting 20 is bend-processed so that the center of the hole for slinging 21*a* and the rotational centers of hinge sections 22*a* lie approximately in the same perpendicular face. Consequently, when the engine-driven work machine 10 is lifted by a crane or the like, a force acts evenly on the hinge sections 22*a*, making it possible to lift the center of gravity of the work machine in a balanced state.

The sling fitting 20, which can be rotated around the hinge, is usually collapsed in the position shown by the broken line in FIG. 1A; it is pulled upright when lifting the engine-driven work machine, and a hook or the like is clipped into hole for slinging 21*a*.

Therefore, usually, (e.g. when the engine-driven work machine is being stored) the collapsed sling fitting 20 protrudes no further than the height of the pipe frame 11. Thus only the engine-driven work machine 10 need be packed away, and it can be packed away above or below other machines.

Figure 2C:
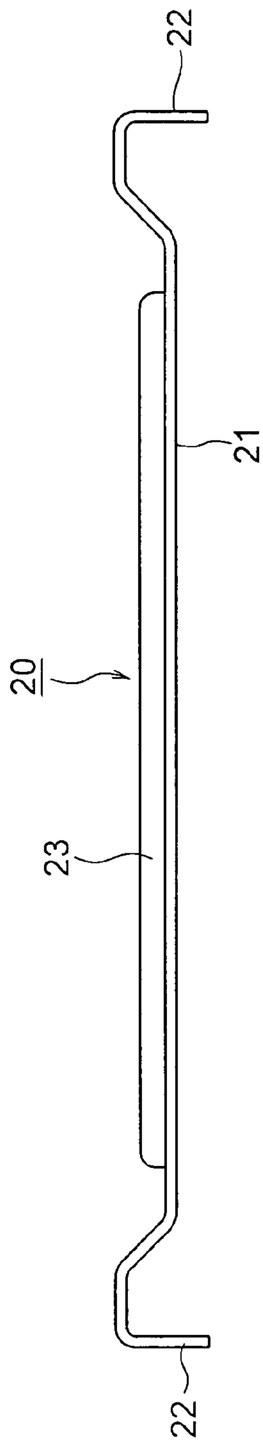
FIGS. 2A to 2D show the shape of a sling fitting in the first embodiment shown in FIGS. 1A to 1C, FIG. 2A showing a front view, FIG. 2B, a left side view, FIG. 2C, a plan view, and FIG. 2D, a cross-sectional view taken along the line A—A of FIG. 2A.
Figure 2A:
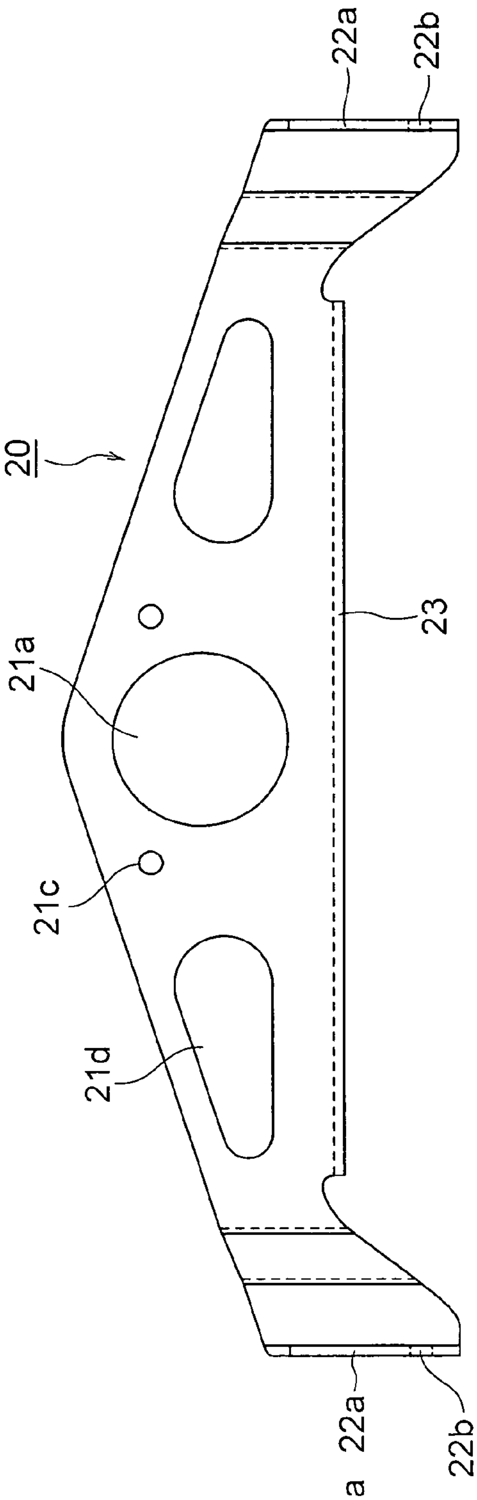
Figure 2D:
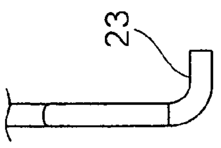
Figure 2B:
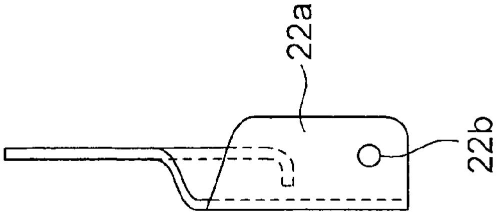

FIGS. 2A, 2B, and 2C show the sling fitting 20 of FIG. 1 in detailed enlargement. FIG. 2A is a front view, FIG. 2B is a left side view, FIG. 2C is a plan view, and FIG. 2D is a cross-sectional view taken along the line A—A of FIG. 2A.

As shown in FIG. 2A, the circular hole for slinging 21*a* is formed in a center section 21, and holes 21*c* for attaching the shock-absorber 21*b* (see FIGS. 1A to 1C) are formed on each side of the hole for slinging 21*a*. One pear-shaped hole 21*d* is provided near each end of the center section 21 in order to reduce the overall weight of the sling fitting 20.

Figure 3:
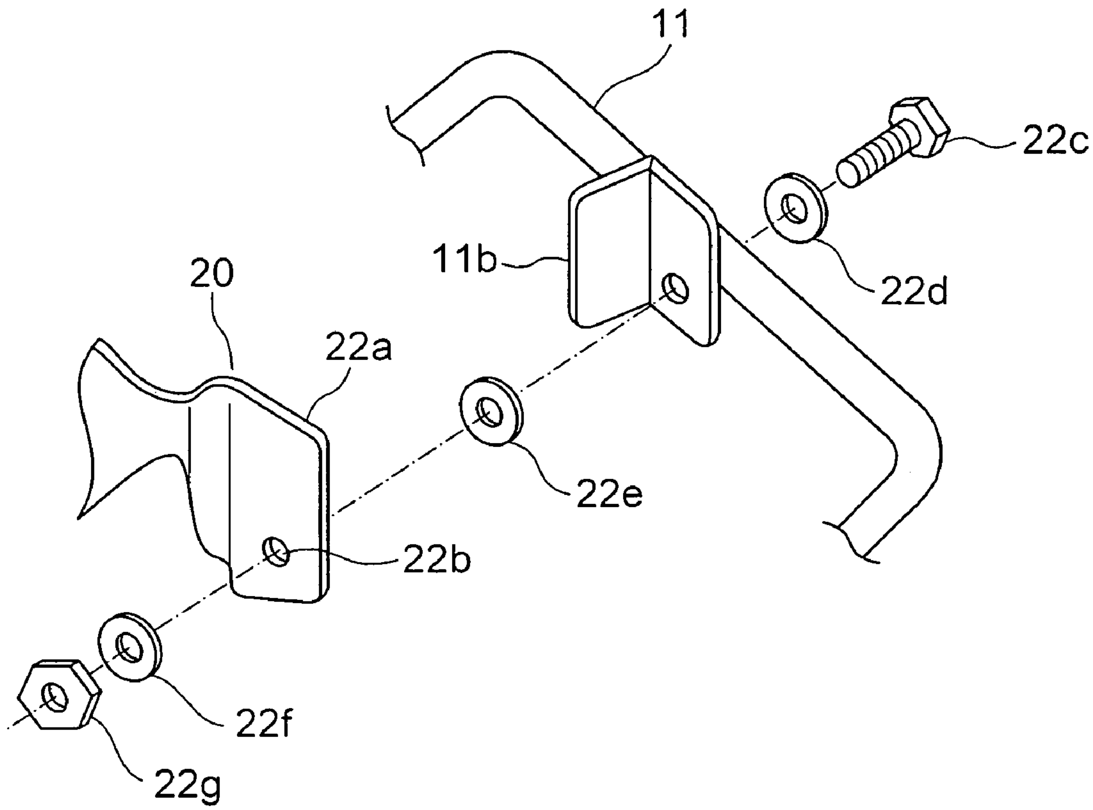
FIG. 3 is a perspective view of one example of a hinge supporting structure for the sling fitting in the first embodiment shown in FIGS. 1A to 1C.

FIG. 3 shows an example of a hinge section structure for the sling fitting in the first embodiment. A bolt 22*c* is inserted through the hinge hole 22*b* in the hinge section 22*a* of the sling fitting 20, which is rotatably supported by the pipe frame 11 using a metal washer 22*d*, a lubricous Duracon (Registered Trademark) washer 22*e*, a metal washer 22*f*, and a looseness-preventing nut 22*g*. A stopper 11*b* is secured to the pipe frame 11, and meshes with the hinge section 22*a* in its standing state.

The lubricous washer 22*e* and the looseness-preventing nut 22*g* are used in order to firmly secure the sling fitting 20 with the bolt 22*c*, and hold it firmly in place. The stopper 11*b* supports the sling fitting 20, and also stops it from colliding with the lid of a fuel tank that is provided below the sling fitting 20.

Embodiment 2

Figure 4C:
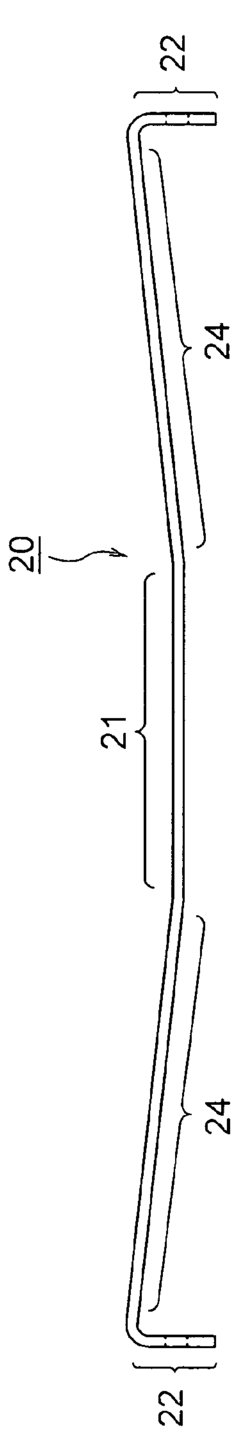
FIGS. 4A to 4C show the shape of a sling fitting in a second embodiment of this invention, FIG. 4A showing a front view, FIG. 4B, a left side view, and FIG. 4C, a plan view.
Figure 4A:
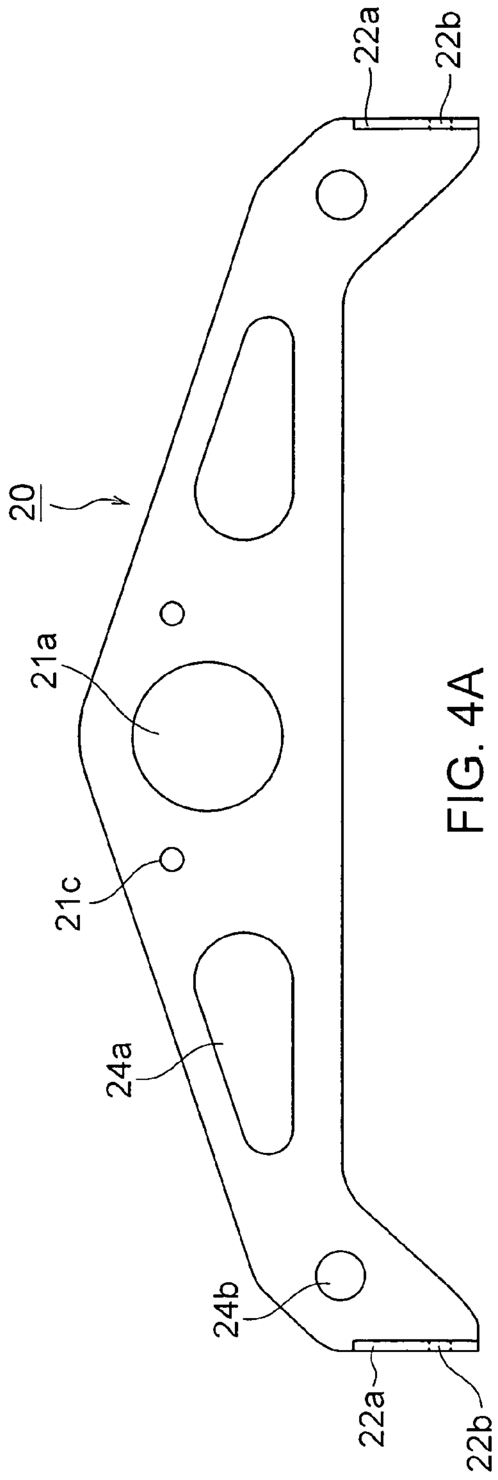
Figure 4B:
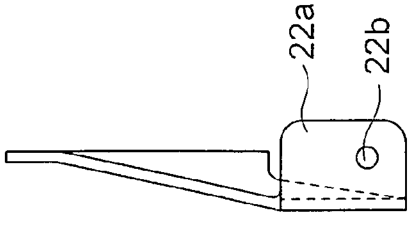

FIGS. 4A, 4B, and 4C show the shape of the sling fitting in a second embodiment of this invention, different from that shown in FIGS. 1 and 2, in enlarged front view, left side view, and top view. The C-shaped bent sections near each end, and the bending edge section 23 along the center bottom edge, are not provided in this case, and consequently the overall shape is approximately bow-shaped when viewed from above.

As shown in FIG. 4A, the shape in front view resembles a coat hanger; as shown in FIG. 4B, the shape in side view is approximately a flat plate-like shape with approximately right-angular bends at each end; as shown in FIG. 4C, the shape in top view is approximately bow-like, with approximately right-angular bends at each end.

As shown in FIG. 4A, a circular hole for slinging 21*a* is provided in a center section 21, and holes 21*c* for attaching the elastic shock-absorber 21*b* (see FIGS. 1A to 1C) are formed on each side of the hole for slinging 21*a*.

As shown in FIG. 4B, the side sections 24 bend at a diagonal angle of ten degrees or so to the center section 21 when seen in plan view, and one pear-shaped hole 24*a* is formed in each side section 24 in order to reduce the overall weight. The side sections 24 bend downwards (as shown in FIGS. 4A to 4C) and weight-reducing round holes 24*b* are provided in them.

The bent sections 22 at the ends of the sling fitting 20 have hinge sections 22*a*, which are nearly at right-angles to the side sections 24, and, as shown in FIG. 4B, a hinge hole 22*b* is provided near the bottom sides of each hinge section 22*a*

Embodiment 3

Figure 5:
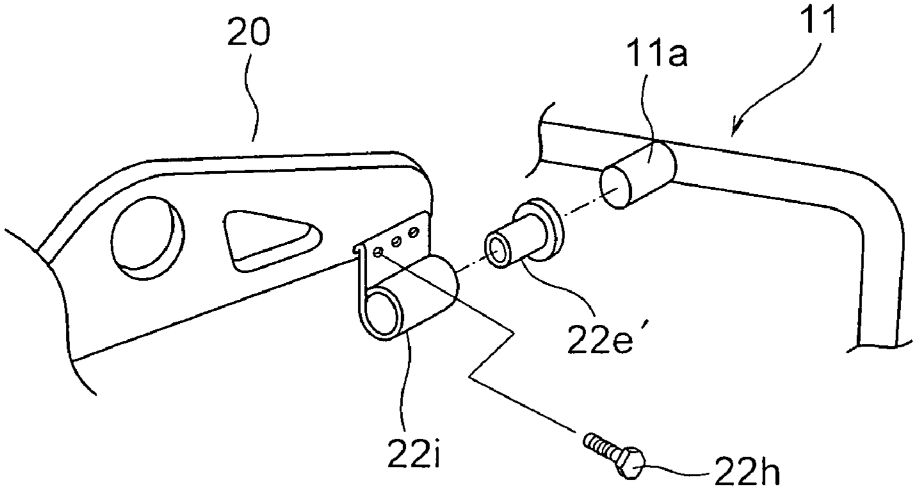
FIG. 5 is an exploded perspective view of a supporting structure for a sling fitting in a third embodiment of this invention.

FIG. 5 shows a supporting structure for the sling fitting in a third embodiment of this invention, where the characteristic feature is the structure of the hinge section 22. The hinge section 22 comprises a joint 22*i*, which is connected by locking bolts 22*h* and fitted via a cylindrical member 22*e*' having a flange to a boss 11*a* that protrudes from the pipe frame 11. The cylindrical member 22*e*' should be comprised of a material such as Duracon.

What is claimed is:

1. An engine-driven work machine comprising a pipe frame, a transportable structure attached to the pipe frame, a sling fitting provided above the pipe frame, the sling fitting having two ends, the sling fitting being hinged to the pipe frame at the two ends of the sling fitting for rotation of the sling fitting with respect to the pipe frame and to be held firmly in place on the pipe frame, and a stopper stopping rotation of the sling fitting in a substantially vertical direction, the sling fitting having a bent section extending at a right-angle to a bottom edge of a center section of the sling fitting, and approximately C-shaped sections being provided adjacent to the two ends of the sling fitting on opposite sides of the center section, the C-shaped sections including hinge sections for rotationally supporting the sling fitting and for engaging with the stopper.

2. The engine-driven work machine as described in claim 1, wherein a lubricious washer is located between the sling fitting and the pipe frame to hold the sling fitting firmly in place at any angle.

* * * * *